United States Patent Office 3,136,769
Patented June 9, 1964

3,136,769
QUINOLINE N-OXIDES
Leslie M. Werbel and Edward F. Elslager, Ann Arbor, Mich., assignors to Parke, Davis & Company, Detroit, Mich., a corporation of Michigan
No Drawing. Filed Mar. 28, 1961, Ser. No. 98,784
2 Claims. (Cl. 260—288)

The present invention relates to 4-aminoquinoline-1-oxide compounds, to salts thereof, and to methods for obtaining the same. More particularly, the invention relates to 4-aminoquinoline-1-oxide compounds of the formula

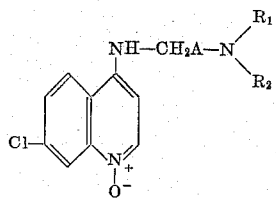

where A represents an alkylene radical containing between 1 and 5 carbon atoms inclusive or a group of the formula,

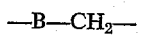

where B represents a hydroxyalkylene radical containing between 1 and 4 carbon atoms inclusive; and $R_1$ and $R_2$ are the same or different and represent hydrogen or an alkyl (including cycloalkyl) radical, or hydroxyalkyl radical containing from 1 to 12 carbon atoms inclusive or radicals wherein $R_1$ and $R_2$ are combined in an alkylene or hydroxyalkylene chain and together with —N< constitute a heterocyclic ring containing from 4 to 8 carbon atoms, 4 to 6 of which are in annular position. Examples of such heterocyclic rings are pyrrolidine, piperidine, hexamethyleneimine, and hydroxy and lower alkyl substituted derivatives thereof.

The above 4-aminoquinoline-1-oxide compounds possess significant antiparasitic properties and are particularly useful in combatting the plasmodia of malaria, intestinal helminths and *Endamoeba histolytica*, the causative agent of amebiasis. In many areas where malaria is a serious health problem there is great interest in the admixture of an antimalarial drug with salt which is locally produced so as to provide a medicated salt which would remain stable under tropical conditions. When structurally similar 4-aminoquinoline antimalarials, such as chloroquine diphosphate, chloroquine sulfate, and the like, which do not contain a 1-oxide are mixed with salt under these humid climatic conditions, as much as 60% to 70% of the drug is lost due to leaching. Inasmuch as the free bases of chloroquine and other similar 4-aminoquinoline antimalarials are low melting solids or viscous oils, they likewise are undesirable for admixture with salt. Unexpectedly, we have found that the free bases of the 4-aminoquinoline-1-oxide compounds of the present invention are, by contrast, non-hygroscopic, high-melting crystalline solids that are highly suitable for admixture with salt. For example, the N-oxide bases can be formulated into free-flowing granulations composed of 10% N-oxide base with 90% sodium chloride, 25% N-oxide base with 75% sodium chloride, 50% N-oxide base with 50% sodium chloride, and the like which retain their excellent flow properties and are resistant to leaching. Further, the claimed N-oxides, in contrast with the prior art compounds, exhibit a strong fluorescence that is particularly useful in detecting and assaying the compounds in salt mixtures and in the host. The 4-aminoquinoline-1-oxide compounds are also important ingredients for use in antimalarial preparations that possess unexpected long-acting antimalarial properties.

Although the free bases of the compounds of the invention are usually preferred, the N-oxides may also be employed in the form of their addition salts with organic or inorganic acids. In general, acid addition salts of any relatively non-toxic organic or inorganic acid are suitable. Some typical examples of these salts are the hydrochloride, hydrobromide, hydriodide, sulphate, phosphate, ethanesulfonate, oxalate, sulfamate, sulfonate, acetate, lactate, tartrate, succinate, benzoate, naphthoate, mandelate, oleate, gluconate, citrate, salicylate, cresotinate, penicillinate, arsanilate, arsonate, fumagillinate, and the like. As examples of preferred salts there may be mentioned the 5,5'-methylene disalicylate, 4,4'-methylene bis-(-3-hydroxy-2-naphthoate), 3-hydroxy-2-naphthoate, methylene di-o-cresotinate, 1,5-naphthalenedisulfonate, 1,4,5,8-naphthalenetetracarboxylate, 8-hydroxy-7-iodo-5-quinoline sulfonate, N-acetyl-4-hydroxy-m-arsanilate, N-glycolyl-p-arsanilate, N,N'-ethylene bis-(p-arsanilate), p-ureidobenzenearsonate, benzylpenicillinate, phenoxymethylpenicillinate, fumagillinate and the like. Certain of these salts are particularly useful in that they possess enhanced amebicidal properties and sustained release antimalarial properties. Salts of the 4-aminoquinoline-1-oxides with various acids can be prepared in several ways. For example, the free base can be isolated and the desired salt subsequently prepared by the introduction of the appropriate acid in accordance with methods which are known in the art. Alternatively, salts of mineral acids such as hydrochloric acid can be converted to other desired salts by the introduction of a basic salt of the appropriate acid, such as the sodium, potassium, or ammonium salts and the like.

The compounds of the invention can be produced by condensing a 4-haloquinoline-1-oxide having the formula,

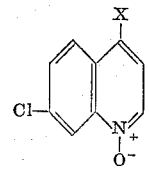

with an aliphatic diamine which in free base form has the formula

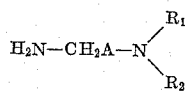

where A, $R_1$ and $R_2$ have the aforementioned significance and X is a halogen atom, preferably chlorine. In carrying out the condensation an excess of amine is usually preferred although it is satisfactory to employ substantially equivalent quantities of the reactants in the presence of a suitable solvent. An excess of amine can be used as the solvent if desired. The preferred solvents are mixtures of lower aliphatic alcohols and water. A small quantity of an acid may be added to the reaction mixture if desired. In general the reaction is favored by temperatures in excess of 75° C. Preferably, the reaction is carried out in the range from about 75° C. to 110° C. The product can be isolated as the free base or if desired, a suitable acid may be introduced and the product isolated as an acid addition salt. For this purpose hydrochloric acid is preferred although organic acids and other mineral acids can likewise be employed.

The invention is illustrated by the following examples.

*Example 1*

(a) A mixture of 32.1 g. of 4,7-dichloroquinoline, 1-oxide and 47.4 g. of 1-amino-3-diethylamino-2-propanol in 600 ml. of ethanol and 90 ml. of water containing 9 drops of concentrated hydrochloric acid is heated under reflux for 24 hours. The solvent is removed in vacuo and the residue triturated with a dilute aqueous solution of sodium hydroxide. The yellow solid that forms is collected and dried in vacuo. The solid is extracted with 200 ml. of warm acetone, and the insoluble yellow 1-[(7-chloro-4-quinolyl)amino]-3-diethylamino-2-propanol, 1-oxide is collected and dried in vacuo; M.P. 190–191° C. after crystallization from dimethylformamide. The formula of this product is

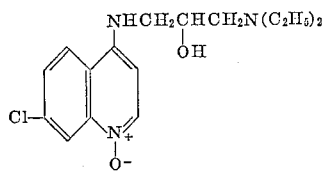

(b) To a solution of 4.2 g. of 1-[(7-chloro-4-quinolyl)-amino]-3-diethylamino-2-propanol, 1-oxide in ethanol is added an excess of a 40% isopropanol-hydrogen chloride solution. Ether is added to precipitate the product. The desired 1-[(7-chloro-4-quinolyl)amino]-3-diethylamino-2-propanol, 1-oxide, dihydrochloride salt is crystallized from ethanol to give white crystals; M.P. 218–221° C.

(c) To a solution of 4.5 g. of 1-[(7-chloro-4-quinolyl)-amino]-3-diethylamino-2-propanol, 1-oxide in water containing 2.4 ml. of concentrated hydrochloric acid is added a water solution of 6.3 g. of disodium 4,4'-methylenebis-(3-hydroxy-2-naphthoate),monohydrate. The yellow salt which separates is removed, dried in vacuo, stirred thoroughly with warm water and re-dried in vacuo to give the desired 1-[(7-chloro-4-quinolyl)amino]-3-diethylamino-2-propanol, 1-oxide salt with one formula weight of 4,4'-methylenebis - (3-hydroxy-2-naphthoic acid),hydrate as a yellow powder, M.P. 192–197° C.

(d) To a solution of 3.5 g. of 1-[(7-chloro-4-quinolyl)-amino]-3-diethylamino-2-propanol, 1-oxide in water containing 1.9 ml. concentrated hydrochloric acid is added a water solution of 4.0 g. of the disodium salt of 1,5-naphthalenedisulfonic acid. The off-white solid which separates is collected, dried in vacuo, stirred thoroughly with warm water and re-dried in vacuo to give the desired 1-[(7-chloro-4 - quinolyl)amino] - 3 - diethylamino-2-propanol, 1-oxide salt with one formula weight of 1,5-naphthalene disulfonic acid as a white powder, M.P. 298–308° C.

Utilizing the preparative method described in Example 1a, the following related compounds can be prepared starting from 4,7-dichloroquinoline, 1-oxide and the appropriate aliphatic diamine:

4-[(7-chloro-4-quinolyl)amino]-1-diethylamino-2-butanol, 1-oxide
1-[(7-chloro-4-quinolyl)-amino]-3-(1-pyrrolidinyl)-2-propanol, 1-oxide
1-[(7-chloro-4-quinolyl)-amino]-3-diethylamino-2-methyl-2-propanol, 1-oxide
1-[(7-chloro-4-quinolyl)-amino]-3-piperidino-2-propanol, 1-oxide
1-[(7-chloro-4-quinolyl)-amino]-3-dimethylamino-2-propanol, 1-oxide Utilizing the preparative methods described under Examples 1b through d, other salts of 1-[(7-chloro-4-quinolyl)-amino]-3-diethylamino-2-propanol, 1-oxide and related compounds can be prepared starting from the free base and one or two equivalents of the following acids:

N-glycolyl-p-arsanilic acid
Fumagillin
Salicylic acid
3-hydroxy-2-naphthoic acid
Sulfuric acid
Hydrobromic acid
Acetic acid
Phosphoric acid The starting material, 4,7-dichloroquinoline, 1-oxide, is prepared as follows: A solution of 204.0 g. of 4,7-dichloroquinoline in 600 ml. of chloroform is treated at room temperature with a solution of 138 g. of perbenzoic acid in 2 liters of chloroform. The resulting mixture is allowed to stand at room temperature for 18 hours. The reddish-brown solution is extracted twice with 1 liter portions of 10% sodium carbonate solution, then washed with water. After drying over potassium carbonate, the solution is concentrated to dryness in vacuo in the presence of platinum foil. Crystallization from ethanol or methyl ethyl ketone gives the desired intermediate, 4,7-dichloroquinoline, 1-oxide, as colorless needles, M.P. 163–164° C.

Example 2

A mixture of 10.7 g. of 4,7-dichloroquinoline, 1-oxide and 15.8 g. of 1-(3-aminopropyl)-3-piperidinol in 250 ml. of ethanol and 30 ml. of water containing 3 drops of concentrated hydrochloric acid is heated under reflux for 20 hours. The solvent is removed in vacuo and the residue treated with a dilute aqueous solution of sodium hydroxide. The aqueous phase is removed by decantation, the residue taken up in acetone, the solution dried over sodium sulfate, and the acetone removed in vacuo. The residue, upon trituration with hot acetone, gives 1-{3-[(7-chloro-4-quinolyl)amino]-propyl}-3-piperidinol, 1'-oxide as a yellow solid. Crystallization from dimethylformamide yields yellow crystals of the product, M.P. 199–209° C., which has the formula

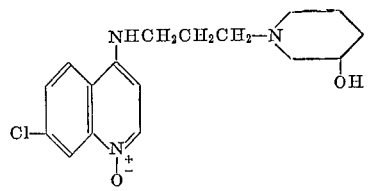

Utilizing the preparative method described under Example 2, the following related compounds can be prepared starting from 4,7-dichloroquinoline, 1-oxide and the appropriate aliphatic diamine:

1-{3-[(7-chloro-4-quinolyl)amino]propyl}-4-piperidinol, 1'-oxide
2-{{3-[(7-chloro-4-quinolyl)amino]propyl}amino} ethanol, 1-oxide
2-{{2-[(7-chloro-4-quinolyl)amino]ethyl}amino} ethanol, 1-oxide
2-{{3-[(7-chloro-4-quinolyl)amino]propyl}methylamino}ethanol, 1-oxide

Example 3

A mixture of 10.7 g. of 4,7-dichloroquinoline, 1-oxide and 17.0 g. of 5-piperidinopentylamine in 200 ml. of absolute ethanol and 30 ml. of water containing 3 drops of concentrated hydrochloric acid is heated under reflux for 24 hours. The solvent is removed in vacuo and the residue is triturated with a dilute aqueous sodium hydroxide solution. The yellow solid which forms is collected and dried in vacuo. The solid is stirred with warm acetone and the insoluble 7-chloro-4-(5-piperidinopentylamino) quinoline, 1-oxide hemihydrate collected. Crystallization from dimethylformamide yields yellow crystals of the product, M.P. 174–176° C., which has the formula

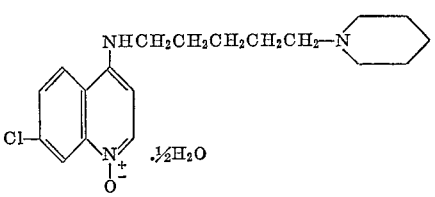

Utilizing the preparative method described under Example 3, the following related compounds can be prepared starting from 4,7-dichloroquinoline, 1-oxide and the appropriate aliphatic diamine:

7-chloro-4-[(3-piperidinopropyl)amino]quinoline,1-oxide M.P. 184.5–187.5° C.
7-chloro-4-[(3-hexamethyleneiminopropyl)amino] quinoline, 1-oxide
7-chloro-4-{[3-(2-methylpiperidino)propyl]amino}- quinoline, 1-oxide
7-chloro-4-(2-piperidinoethylamino)quinoline, 1-oxide

Example 4

A mixture of 10.7 g. of 4,7-dichloroquinoline, 1-oxide and 13.0 g. of N,N-diethyl-1,3-propanediamine in 200 ml. of absolute ethanol and 30 ml. of water containing 3 drops of concentrated hydrochloric acid is heated under reflux for 24 hours. The solvent is removed in vacuo and the residue triturated with a dilute aqueous sodium hydroxide solution. The solid which forms is collected and dried in vacuo. The solid is then extracted with warm acetone and the insoluble 7-chloro-4-[(3-diethylaminopropyl)amino]quinoline, 1-oxide is collected and dried in vacuo. Crystallization from dimethylformamide yields yellow crystals of the product, M.P. 150–152° C., which has the formula

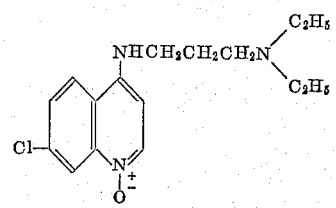

Utilizing the preparative method described under Example 4, the following related compounds can be prepared starting with 4,7-dichloroquinoline, 1-oxide and the appropriate aliphatic diamine:

7-chloro-4-{[3-(isopropylmethylamino)propyl]-amino} quinoline, 1-oxide
7-chloro-4-[(3-dimethylaminopropyl)amino]quinoline, 1-oxide
7-chloro-4-{[3-(dodecylmethylamino)propyl]amino}- quinoline, 1-oxide
7-chloro-4-[(6-diethylaminohexyl)amino]quinoline, 1-oxide
7-chloro-4-[(3-dioctylaminopropyl)amino]quinoline, 1-oxide

Example 5

A mixture of 10.7 g. of 4,7-dichloroquinoline, 1-oxide and 13.2 g. of 2-[(2-aminoethyl)-ethylamino]ethanol in 200 ml. of absolute ethanol and 30 ml. of water containing 3 drops of concentrated hydrochloric acid is heated under reflux for 24 hours. The solvent is removed in vacuo and the residue triturated with a dilute aqueous sodium hydroxide solution. The gummy solid which forms is collected, dried in vacuo and extracted with warm acetone. The insoluble 2-{{2-[(7-chloro-4-quinolyl)amino]-ethyl}ethylamino}ethanol, 1-oxide which remains is recrystallized from dimethylformamide; yellow crystals, M.P. 148–150° C. The product has the formula

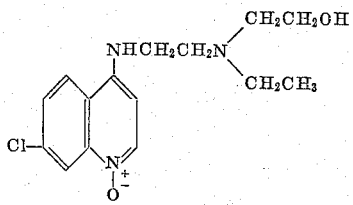

Utilizing the preparative method described under Example 5, the following related compounds can be prepared starting with 4,7-dichloroquinoline, 1-oxide and the appropriate aliphatic diamine:

2-{{3-[(7-chloro-4-quinolyl)amino]propyl}ethylamino}ethanol, 1-oxide
2-{{5-[(7-chloro-4-quinolyl)amino]-pentyl}ethylamino}ethanol, 1-oxide
2-{butyl{3-[(7-chloro-4-quinolyl)amino]-propyl}amino}ethanol, 1-oxide
2-{{3-[(7-chloro-4-quinolyl)amino]-propyl}octylamino}ethanol, 1-oxide

Example 6

A mixture of 10.7 g. of 4,7-dichloroquinoline, 1-oxide and 12.8 g. of 3-(1-pyrrolidinyl)propylamine in 200 ml. absolute ethanol and 30 ml. of water containing 3 drops of concentrated hydrochloric acid is heated under reflux for 24 hours. The solvent is removed in vacuo and the residue triturated with a dilute aqueous solution of sodium hydroxide. The yellow solid which forms after a short time is collected, dried in vacuo, and extracted with warm acetone. The insoluble 7-chloro-4-{[3-(1-pyrrolidinyl)-propyl]amino}quinoline, 1-oxide is collected and dried. Crystallization from dimethylformamide gives yellow crystals of the product, M.P. 185–187° C., which has the formula

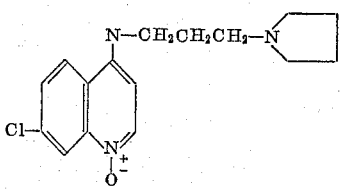

Utilizing the preparative method described in Examples 6, the following related compounds can be prepared starting from 4,7-dichloroquinoline, 1-oxide and the appropriate aliphatic diamine:

7-chloro-4-{[2-methyl-2-(1-pyrrolidinyl)-ethyl]-amino}quinoline, 1-oxide
7-chloro-4-{[4-(1-pyrrolidinyl)-butyl]amino}quinoline, 1-oxide
7-chloro-4-{[3-(2-methyl-1-pyrrolidinyl)propyl]-amino}quinoline, 1-oxide
7-chloro-4-{[2,2-dimethyl-3-(1-pyrrolidinyl)propyl]-amino}quinoline, 1-oxide

Example 7

A mixture of 10.7 g. of 4,7-dichloroquinoline, 1-oxide and 11.6 g. of N-isopropyl-1,3-propanediamine in 200 ml. of absolute ethanol and 30 ml. of water containing 3 drops of concentrated hydrochloric acid is heated under reflux for 24 hours. The solvent is removed in vacuo and the residue triturated with a dilute aqueous solution of sodium hydroxide. The yellow solid is collected, dried in vacuo and extracted with warm acetone. The insoluble 7-chloro-4-[(3-isopropylaminopropyl)-amino] quinoline, 1-oxide is collected, dried, and crystallized from dimethylformamide to yield yellow crystals of the product, M.P. 176–179° C., which has the formula

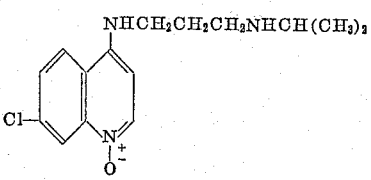

Utilizing the preparative method described under Example 7, the following related compounds can be prepared starting from 4,7-dichloroquinoline, 1-oxide and the appropriate aliphatic diamine:

7-chloro-4-[(3-cyclohexylaminopropyl)amino]-quinoline, 1-oxide
4-[(3-tert-butylaminopropyl)-amino]-7-chloroquinoline, 1-oxide
7-chloro-4-[(4-ethylaminobutyl)amino]quinoline, 1-oxide
1-[(7-chloro-4-quinolyl)amino]-3-cyclohexylamino-2-propanol, 1-oxide

Example 8

A mixture of 10.7 g. of 4,7-dichloroquinoline, 1-oxide and 11.6 g. of N,N-diethylethylenediamine in 200 ml. of absolute ethanol and 30 ml. of water containing 3 drops of concentrated hydrochloric acid is heated under reflux for 24 hours. The solvent is removed in vacuo and the residue is triturated with a dilute aqueous solution of sodium hydroxide. A solid slowly forms, and this material is collected, dried, and extracted with warm acetone. The insoluble 7-chloro-4-[(2-diethylaminoethyl)amino]quinoline, 1-oxide is collected, dried in vacuo, and recrystallized from dimethylformamide to yield yellow crystals of the product, M.P. 185–187° C., which has the formula

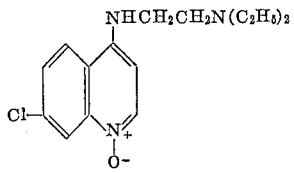

Utilizing the preparative method described under Example 8, the following related compounds can be prepared starting from 4,7-dichloroquinoline, 1-oxide and the appropriate diamine:

7-chloro-4-[(4-diethylaminopentyl)amino]quinoline, 1-oxide
7-chloro-4-{[3-(cyclopentylmethylamino)propyl]-amino}quinoline, 1-oxide
7-chloro-4-[(3-diisopropylaminopropyl)amino]-quinoline, 1-oxide
7-chloro-4-{[3-(ethylmethylamino)propyl]amino}quinoline, 1-oxide

Example 9

A mixture of 10.7 g. of 4,7-dichloroquinoline, 1-oxide and 18.6 g. of N-octyl-1,3-propanediamine in 200 ml. absolute ethanol and 30 ml. of water containing 3 drops of concentrated hydrochloric acid is heated under reflux for 24 hours. The solvent is removed in vacuo and the residue triturated with a dilute aqueous solution of sodium hydroxide. The solid which forms is collected, dried, and extracted with warm acetone. The insoluble 7-chloro-4[(3-octylaminopropyl)-amino]quinoline, 1-oxide is collected and dried in vacuo. Recrystallization from dimethylformamide gives yellow crystals of the product, M.P. 107–108° C., which has the formula

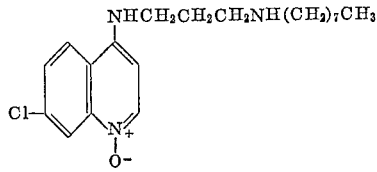

Utilizing the preparative method described under Example 9, the following related compounds can be prepared starting from 4,7-dichloroquinoline, 1-oxide and the appropriate diamine:

7-chloro-4-[(5-octylaminopentyl)amino]quinoline, 1-oxide
7-chloro-4-[(3-ethylaminopropyl)amino]quinoline, 1-oxide
7-chloro-4-{{3-[(1-ethylpentyl)amino]propyl}amino}quinoline, 1-oxide
7-chloro-4[(3-dodecylaminopropyl)amino]quinoline, 1-oxide

We claim:
1. A member of the class consisting of a free base of the formula

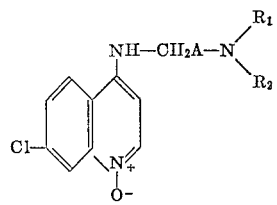

and non-toxic acid-addition salts thereof; where A is alkylene of 1 to 5 carbon atoms inclusive, and $R_1$ and $R_2$ represents a hydroxyalkylene chain of 4 to 6 carbon atoms and together with —N< constitute a 4 to 6 carbon (monohydroxy)-substituted heterocyclic ring.

2. 1 - {3-[(7-chloro-4-quinolyl)amino]propyl}-3-piperidinol, 1'-oxide.

References Cited in the file of this patent

UNITED STATES PATENTS

| | | |
|---|---|---|
| 2,233,970 | Andersag et al. | Mar. 4, 1941 |
| 2,485,162 | Parham | Oct. 18, 1949 |
| 2,653,940 | Johnson | Sept. 29, 1953 |
| 2,880,210 | Elslager et al. | Mar. 31, 1959 |
| 2,951,078 | Biel | Aug. 30, 1960 |

FOREIGN PATENTS

| | | |
|---|---|---|
| 680,255 | Great Britain | Oct. 1, 1952 |

OTHER REFERENCES

Drake et al.: J. Amer. Chem. Soc., vol. 68, pp. 1208–13 (1946) p. 1213 relied on, QD 1 A5.

Linsker et al.: J. Amer. Chem. Soc., vol. 68, pp. 192–93 (1946).

Ames et al.: J. Chem. Soc., (London), pages 3079–82 (1956).

Burger: Medicinal Chemistry, 2d. Ed. pages 830 and 833 (1960) RS 403 B8.